United States Patent Office 3,132,995
Patented May 12, 1964

3,132,995
ENDOTOXIN FRACTIONS AND METHOD FOR PRODUCING SAME
Frank M. Berger, Princeton, Clarence Hubbard, Millstone, and Werner Braun, Princeton, N.J., assignors to Carter Products, Inc., New York, N.Y., a corporation of Maryland
No Drawing. Filed Oct. 20, 1961, Ser. No. 146,438
10 Claims. (Cl. 167—78)

This invention relates to novel bacterial endotoxin fractions and a method for obtaining such fractions. The endotoxin fractions of this invention have desirable and beneficial properties as prophylactic and therapeutic agents, particularly the property of conferring protection against a wide variety of infectious agents.

It has been recognized for a long time that certain substances known as endotoxins may be obtained from microorganisms, primarily from gram-negative bacteria such as *Escherichia coli*, Salmonella sp., Shigella sp., Brucella sp., Serratia sp., Pseudomonas sp., etc. Endotoxin also has been isolated in some cases from other gram-negative bacteria (Pasteurella sp., Vibrio sp., Neisseria sp., Veillonella sp.) and from gram-positive group A streptococci.

Bacterial endotoxins produced by prior methods have been shown to possess some activity in enhancement of resistance, including natural resistance of warm-blooded animals, to infectious agents. Unfortunately, however, such endotoxins have associated therewith a number of drawbacks, among which is high toxicity.

Endotoxins may be regarded as complexes of polysaccharide, lipid and protein. The precise chemical composition of the complexes responsible for their activity has not been established. More particularly, previous workers have prepared bacterial endotoxins by a variety of procedures. The most commonly employed procedure involves the treatment of bacterial cells with trichloroacetic acid or with aqueous phenol to liberate the endotoxin material. The endotoxin is subsequently obtained by concentration of the liquid phase and is separated as an insoluble precipitate. Endotoxin prepared in this manner, although active in conferring protection, possesses a high order of toxicity and has limited usefulness in therapeutic applications.

Other procedures that have been employed for the isolation of endotoxin from bacterial cells are enzymatic digestion, fractionation with diethylene glycol, fractionation by treatment with urea, extraction with pyridine, and water-ether extraction. None of these methods have yielded a product wherein the beneficial properties have been extensively separated from the inherent toxicity of the endotoxins.

Objects and advantages of the invention will be set forth in part hereinafter and in part will be obvious herefrom, or may be learned by practice with the invention, the same being realized and attained by means of the steps, methods and compositions pointed out in the appended claims.

The invention consists in the novel steps, methods and compositions herein described.

An object of this invention is to provide novel bacterial endotoxin fractions which are capable of conferring a high degree of protection to warm-blooded animals against infectious agents while possessing a low order of toxicity to warm-blooded animals. Another object of this invention is to provide a novel method for the production of bacterial endotoxin fractions of this invention.

In obtaining an endotoxin fraction in accordance with this invention, the bacterial cells, preferably those of the gram-negative type, are treated in the following manner:

(1) The bacterial cells are mixed with water to form an aqueous suspension thereof;

(2) The resulting suspension is then combined with a suitable water-immiscible organic solvent (e.g., ethyl ether) capable of forming an emulsion therewith upon proper mixing thereof in the presence of a suitable emulsifying agent;

(3) After an appropriate time in the emulsified stage, the aqueous phase is separated from the non-aqueous phase of the emulsion.

(4) The aqueous fraction is then dialyzed against water by use of a conventional membrane for this purpose such as cellophane, whereby the lower molecular weight, inorganic ions and components are caused to pass through the membrane while the higher molecular weight organic components, including the active fraction, are retained in the aqueous portion.

(5) The aqueous layer is then concentrated under reduced pressure to obtain a concentrate which contains dissolved or dispersed therein the endotoxin fraction; and (6) The concentrate is then combined with a precipitating agent to fractionate the water-soluble portion of the concentrate into endotoxin fractions having a combination of high activity and low toxicity. The precipitating agent (e.g., acetone) is a liquid in which the endotoxin fraction is insoluble.

The properties of a particular endotoxin fraction that is precipitated depend upon the concentration of the precipitating agent that is added to the concentrate. For example, when the precipitating agent is acetone, it has been found that the precipitated endotoxin fractions having the greatest activity in affording protection against infectious agents and the least toxicity, including low pyrogenicity, to warm-blooded animals, are those obtained when the acetone is in an amount of from about 33 to 50% by volume of the total volume of the concentrate and precipitating agent.

The endotoxin fraction produced in accordance with this invention possesses a molecular weight sufficiently high so that it is not ordinarily dialyzable in aqueous solution through a typical semipermeable membrane. It can be precipitated from aqueous solution by the addition of water-miscible organic solvents. It is stable to moderate heat, but its solutions cannot be boiled without undergoing decomposition. Exposure to mild acid conditions (pH of 1 for 1 hour) causes no loss in potency, but adjustment of its solutions to pH 12 and higher brings about extensive inactivation, as measured by its protective action against lethal challenge doses of *Pseudomonas aeruginosa* in mice.

The following is a specific working example for the preparation of bacterial endotoxin fractions in accordance with the present invention.

EXAMPLE 1

100 g. of frozen cells obtained from a fresh culture of *E. coli* grown in synthetic medium is suspended in 250 ml. of distilled water and gently stirred for 48 hours at a temperature of 2 to 5° C. An additional 750 ml. of distilled water is added and to this mixture 750 ml. of diethyl ether is added. 10 g. of polysorbate 80 (polyethylene oxide sorbitan mono-oleate), or its equivalent, is added to the mixture to promote emulsification and the mixture thoroughly mixed by stirring continuously at room temperature for 1 to 2 hours. It is then contrifuged at about 10,000 r.p.m. at 0° C. to remove the aqueous fraction. The latter is concentrated by evaporation of excessive water under diminished pressure and the concentrate dialyzed against distilled water for 48 hours at 5° C. The dialyzed mixture is again centrifuged at 0° C. to remove the small amount of insoluble matter present. The clear aqueous fraction is treated with 0.36 g. of sodium acetate. Sufficient acetone is added to give a concentration of 33% acetone by volume. The resulting precipitate is removed by centrifugation and identified as fraction A. The remaining solution is treated with sufficient additional acetone to give a concentration of 50% by volume. The solid which precipitates is removed as above and identified as fraction B. A further addition of acetone to 80% by volume is carried out, and the solid material likewise removed (fraction C). These fractions are separately washed with acetone and with ether and dried under reduced pressure. From 100 g. of frozen cells there is obtained approximately 1.2 g. of fraction A, approximately 1.2 g. of fraction B, and approximately 0.3 g. of fraction C.

A typical sample of fraction B, prepared as above, on analysis was found to contain 0.25% hexoseamine and 59% protein. In addition, it was found on hydrolysis to yield the amino acids alanine, lysine, histidine, threonine, tryptophan, valine, phenylalanine, tyrosine, proline, hydroxyproline, leucine, isoleucine, glutamic acid, serine, glycine, methionine and cysteine.

As indicated heretofore, the endotoxin fractions of this invention have been found capable of producing in warm-blooded animals protective effects against infection without the toxic attributes of previously available endotoxin preparations.

The products obtained by the method illustrated by the example were evaluated for their protective action against the effects of pathogenic as follows:

Males of the $CF_1$ strain of Swiss-Webster mice, weighing 20 to 25 g. were used in all experiments. Appropriate serially diluted samples of endotoxin fractions were administered in a single dose via the intraperitoneal route to groups of mice, each group containing at least 10 mice. One to two days after the endotoxin fractions were administered, the treated mice were challenged with a dose of a pathogenic bacterial culture adjusted to kill 90 to 100 percent of the untreated control mice within one to five days. The number of dead mice were counted at twenty-four hour intervals after challenge and the $PD_{50}$ values, expressed in micrograms per kilogram of animal weight, surviving in the treated groups at a time when 90 to 100% of the untreated control mice had succumbed to the challenge dose of bacteria. The $PD_{50}$ values and their 95% confidence limits were calculated by the method of Litchfield and Wilcoxon. The challenging dose of organism employed in the above evaluation and the route of administration varied widely with the micro-organism being used for challenge as shown in the following table:

Table 1

| Culture | Route of challenge | Number of viable cells | No. of $LD_{50}$ doses |
|---|---|---|---|
| Diplococcus pneumoniae | I.P. | $1.3 \times 10^7$ | $6 \times 10^5$ |
|  | I.V. | $2.2 \times 10^9$ | $3.6 \times 10^3$ |
| Salmonella typhimurium | I.P. | $3.9 \times 10^6$ | $2.4 \times 10^5$ |
|  | I.V. | $4.0 \times 10^7$ | $1.7 \times 10^3$ |
| Salmonella typhosa | I.P. | $2.8 \times 10^7$ | 5 |
| Pseudomonas aeruginosa | I.V. | $1.0 \times 10^7$ | 2 |
| Streptococcus pyogenes | I.P. | $2.6 \times 10^7$ | $1.4 \times 10^6$ | were determined on the basis of the number of animals

The method of establishing the toxicity of endotoxins in terms of lethal effects in mice, was as follows:

Males of the $CF_1$ strain of Swiss-Webster mice, weighing 20 to 25 g. were used. Endotoxins were given intraperitoneally in either one of four or five different concentrations. Ten mice were used at each dosage level. Litchfield and Wilcoxon's method was used to calculate $LD_{50}$ values, and their 95% confidence limited based on the number of mice dead at four days following administration of endotoxin. The values given in the table are the result of four or five experiments for each preparation.

Typical endotoxin fractions prepared by the method illustrated hereinbefore in detail in Example 1 have been evaluated following the procedures described earlier to establish their toxicity ($LD_{50}$), and their protectivity against pathogenic organisms ($PD_{50}$). The $LD_{50}$ values are expressed in milligrams per kilogram of animal weight, while the $PD_{50}$ values are expressed in micrograms per kilogram of animal weight. For comparison, the corresponding values obtained using a commercially available endotoxin preparation (Difco) are included. These data are summarized in Table 2.

The toxicity criterion in Table 2 is expressed in terms of lethal effects in mice. It has been found that the endotoxin fractions of this invention show similar lower toxicities compared to known endotoxin compositions when the toxicity criterion is expressed in terms of pyrogenicity (production of fever) when administered to rabbits.

Table 2

THE TOXIC ($LD_{50}$) AND PROTECTIVE ($PD_{50}$) VALUES OF ENDOTOXIN FRACTIONS IN SWISS-WEBSTER $CF_1$ MICE

| Endotoxin fraction | | Toxicity, $LD_{50}$ (95% confidence limits), milligrams/ kilogram | Protection | |
|---|---|---|---|---|
| No. | Source | | Challenge agent | $PD_{50}$ (95% confidence limits), micrograms/ kilogram |
| 1 | Pseudomonas aeruginosa | 49 (42–57) | Pseudomonas aeruginosa | 8 (4–15) |
|  |  |  | Salmonella typhimurium | 17 (5.3–54) |
| 2 | Escherichia coli | 410 (256–656) | Pseudomonas aeruginosa | 8 (4–15) |
|  |  |  | Salmonella typhimurium | 17 (5.3–54) |
|  |  |  | Salmonella typhosa | 40 (23–68) |
| 3 | Escherichia coli | >280 | Pseudomonas aeruginosa | 1 (0.5–2.3) |
|  |  |  | Salmonella typhimurium | 43 (17–110) |
|  |  |  | Salmonella typhosa | 50 (14–190) |
| 4 | Escherichia coli | 620 (295–1,300) | Salmonella aeruginosa | 0.22 (0.081–0.59) |
| Difco | Escherichia coli | 10 (7.4–13.5) | Pseudomonas aeruginosa | 2 (0.8–6) |

Commercially available endotoxins, when evaluated using these same methods, show a wide variation in protective activity and toxicity. This is illustrated in Table 3 which lists these properties for several commercial samples of endotoxin, and endotoxin No. 5 which is obtained by the method of this invention and is included among the endotoxins given in Table 2. In these assays, the endotoxins were assayed in Swiss-Webster CF₁ mice using *Salmonella aeruginosa* as the challenging organism.

Table 3

| Endotoxin | LD$_{50}$ (95% confidence limits), milligrams/ kilogram | PD$_{50}$ (95% confidence limits), micrograms/ kilogram |
|---|---|---|
| Difco Labs. *Escherichia coli* 026:B6 (118374) | 10 (7.4–13.5) | 70 (28–180) |
| Difco Labs. *Escherichia coli* 026.B6 (449944) | 24 (14–42) | 310 (79–1,210) |
| Baxter Labs. Piromen | >0.4 | 270 (110–660) |
| Merck Lipid A | >10 | 2,500 (1,100–5,800) |
| Endotoxin 4 of Table 2 | 620 (295–1,300) | 0.22 (0.081–.59) |

In Table 4 which follows there is summarized data which show: (1) the necessity of employing an emulsifying agent in the formation of an emulsion in step 2 described hereinbefore in detail, in order to obtain an endotoxin fraction of high activity and low toxicity, as well as a good recovery of the desired fraction; and, (2) the importance of time of emulsification in obtaining an endotoxin fraction having superior properties; and, (3) the relative activity of fractions combined with different concentrations of acetone.

In obtaining the data given in Table 4, the endotoxin was administered via the intraperitoneal route and twenty-four hours later the animals challenged with two LD$_{50}$ doses of *Salmonella typhosa* also administered by the intraperitoneal route. The toxicity of the endotoxins, LD$_{50}$, are expressed in milligrams per kilogram of animal weight, with the 95% confidence limits in parenthesis where available. The protective activity of the endotoxins, PD$_{50}$, are expressed in micrograms per kilogram of animal weight, with the 95% confidence limit in parenthesis where available. Fractions A, B and C refer to endotoxin fractions obtained by treatment of the aqueous concentrate with 33%, 50% and 80% by volume, respectively, of acetone as described earlier. Yields are expressed as percentage of dry weight of cells.

Table 4
PROTECTIVE ACTIVITY AND TOXICITY OF *E. COLI* ENDOTOXINS

| Fraction | Emulsion time, hr. | Polysorbate 80 | Yield, percent | LD$_{50}$, milligrams/ kilogram | PD$_{50}$, micrograms/ kilogram |
|---|---|---|---|---|---|
| A | 1 | + | 1.0 | 82 (37–180) | 0.68 (0.17–2.7) |
| B | 1 | + | 1.5 | 620 (295–1,300) | 0.22 (0.081–.59) |
| C | 1 | + | 1.2 | 228 (134–388) | 3.4 (1.1–10) |
| A | 2 | + | 1.1 | 180 (124–261) | 6.4 (1.5–27) |
| B | 2 | + | 2.3 | 230 (144–368) | 6.8 (1.6–29) |
| C | 2 | + | 1.7 | 86 (70–105) | 1.5 (0.4–5.7) |
| A | 24 | + | 1.2 | 1,400 (280–7,000) | 5.0 (1.3–20) |
| B | 24 | + | 3.4 | 280 (100–780) | 1.3 (.34–4.9) |
| C | 24 | + | 2.0 | 97 (72–131) | 1.0 (.19–5.2) |
| A | 1 | − | 0.13 | >80 | 620 |
| B | 1 | − | 0.13 | >80 | 2 |
| C | 1 | − | 0.91 | >280 | 0.6 |
| A | 2 | − | 0.12 | >80 | 50 |
| B | 2 | − | 0.10 | >80 | 340 |
| C | 2 | − | 0.93 | >280 | >1,000 |
| A | 24 | − | 0.19 | >80 | 100 |
| B | 24 | − | 0.32 | >80 | 1,000 |
| C | 24 | − | 1.3 | >280 | 100 |

The invention in its broader aspects is not limited to the specific steps, methods and compositions herein described but departures may be made therefrom within the scope of the accompanying claims without departing from the principles of the invention and without sacrificing its chief advantages.

What is claimed is:

1. The method of producing a bacterial endotoxin fraction capable of conferring a high degree of protection to warm-blooded animals against infectious agents while possessing a low order of toxicity including a low degree of pyrogenicity, comprising: mixing bacterial cells containing endotoxin with water to form a suspension thereof; mixing said suspension with a water-insoluble organic liquid and an emulsifying agent to form an emulsion containing an aqueous layer and a non-aqueous layer; separating the aqueous layer from the non-aqueous layer; dialyzing the aqueous layer against water employing a suitable dialyzing membrane whereby lower molecular weight inorganic ions and components present in said aqueous layer are caused to pass through the membrane while the higher molecular weight organic components are retained in the aqueous layer; concentrating the aqueous layer by removal of water therefrom to leave a concentrate which contains a water-soluble endotoxin fraction; and, incorporating with said concentrate, a precipitating agent to fractionate the water-soluble portion of the concentrate to obtain an endotoxin fraction of high activity and low toxicity, the precipitating agent being a liquid in which the endotoxin fraction is insoluble.

2. The method of producing a bacterial endotoxin fraction according to claim 1, in which the emulsifying agent is polyethylene oxide sorbitan mono-oleate.

3. The method of producing a bacterial endotoxin fraction according to claim 1, in which the emulsifying agent is polyethylene oxide sorbitan mono-oleate and the endotoxin fraction precipitating agent is acetone.

4. The method of producing a bacterial endotoxin fraction according to claim 1, in which the endotoxin fraction precipitating agent is acetone.

5. The method of producing a bacterial endotoxin fraction according to claim 4, in which acetone is incorporated in an amount from about 33 to 50% by volume of the combined volume of acetone and concentrate.

6. A bacterial endotoxin fraction capable of conferring a high degree of protection to warm-blooded animals against infectious agents while possessing a low order of toxicity; which is not dialyzable in aqueous membrane through a typical semipermeable membrane; which is stable to moderate heat whose solutions cannot be boiled without undergoing decomposition; which exhibits no loss in potency when exposed to mild acid conditions, but adjustment of its solutions to pH 12 and higher brings about extensive inactivation, as measured by its protective action against lethal challenge doses of *Pseudomonas aeruginosa* in mice; and which is derived from bacterial cells containing endotoxin by the following series of steps: mixing bacterial cells containing endotoxin with water to form a suspension thereof; mixing said suspension with a water-insoluble organic liquid and an emulsifying agent to form an emulsion containing an aqueous layer and a non-aqueous layer; separating the aqueous layer from the non-aqueous layer; dialyzing the aqueous layer against water employing a suitable dialyzing membrane whereby lower molecular weight inorganic ions and components present in said aqueous layer are caused to pass through the membrane while the higher molecular weight organic components are retained in the aqueous layer; concentrating the aqueous layer by removal of water therefrom to leave a concentrate containing a water-soluble endotoxin fraction; and incorporating with said concentrate, a precipitating agent to fractionate the water-soluble portion of the concentrate to obtain an endotoxin fraction of high activity and low toxicity, the precipitating agent being a liquid in which the endotoxin fraction is insoluble.

7. A bacterial endotoxin fraction according to claim 6, where the emulsifying agent used is polyethylene oxide sorbitan mono-oleate.

8. A bacterial endotoxin fraction according to claim 6, wherein the emulsifying agent used is polyethylene oxide mono-oleate and the precipitating agent is acetone.

9. A bacterial endotoxin fraction according to claim 6, wherein the precipitating agent used is acetone.

10. A bacterial endotoxin fraction according to claim 9, wherein the acetone is incorporated in an amount from about 33 to 50% by volume of the combined volume of acetone and concentrate.

References Cited in the file of this patent

UNITED STATES PATENTS

| 2,020,647 | Hunwicke | Nov. 12, 1935 |
| 2,118,117 | Sevag | May 24, 1938 |
| 2,963,403 | Hiestand | Dec. 6, 1960 |

OTHER REFERENCES

Haskins et al.: J. Expt'l Med., vol. 114, pp. 665–684 (1961).

Kabat et al.: Experimental Immunochemistry, 2nd ed., pages 740–744, 830–839, pub. May 1961 by Charles C. Thomas, Springfield, Ill.

Glassman: Bacteriological Reviews, vol. 12, pages 121–134 (1948).

UNITED STATES PATENT OFFICE
CERTIFICATE OF CORRECTION

Patent No. 3,132,995                                    May 12, 1964

Frank M. Berger et al.

It is hereby certified that error appears in the above numbered patent requiring correction and that the said Letters Patent should read as corrected below.

Columns 3 and 4, Table 2, column 4, line 9 thereof, for "Salmonella", in italcis, read -- Pseudomonas --, in italics; column 4, line 74, for "endotoxin No. 5" read -- endotoxin No. 4 --; column 5, line 3, for "Salmonella", in italics, read -- Pseudomonas --, in italics; column 6, line 38, for "membrane" read -- solution --.

Signed and sealed this 17th day of November 1964.

(SEAL)
Attest:

ERNEST W. SWIDER                                EDWARD J. BRENNER
Attesting Officer                                   Commissioner of Patents